March 15, 1932.  A. J. LOEPSINGER  1,849,764
VALVE
Filed Jan. 29, 1929    3 Sheets-Sheet 3
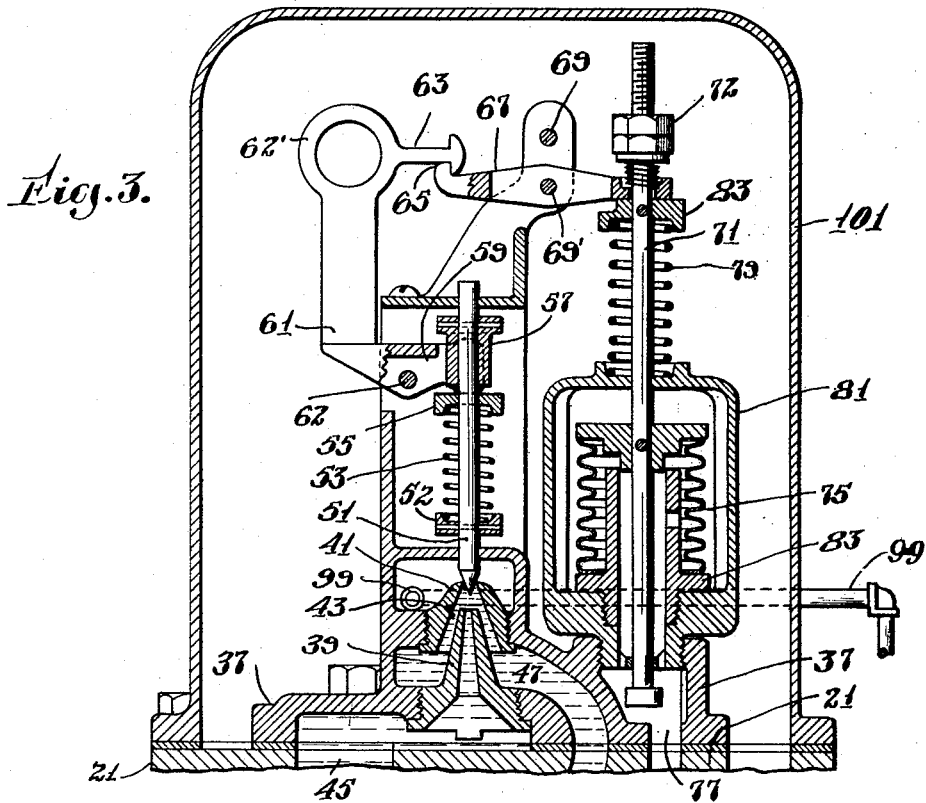
Fig. 3.
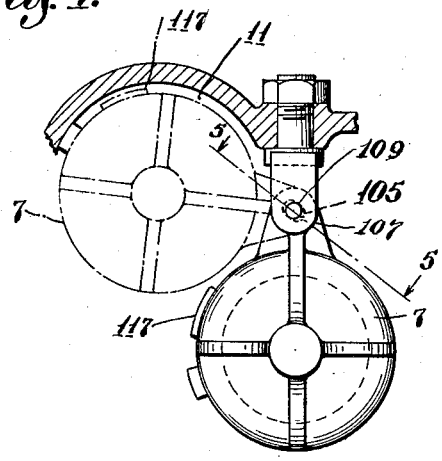
Fig. 4.
Fig. 5.
Inventor
Albert J. Loepsinger
by Harry Dexter Peck
Attorney Patented Mar. 15, 1932

1,849,764

UNITED STATES PATENT OFFICE

ALBERT J. LOEPSINGER, OF PROVIDENCE, RHODE ISLAND, ASSIGNOR TO GENERAL FIRE EXTINGUISHER COMPANY, OF PROVIDENCE, RHODE ISLAND, A CORPORATION OF DELAWARE

VALVE

Application filed January 29, 1929. Serial No. 335,908.

This invention relates to improvements in valves. More especially it has to do with a valve which holds back the water supply in a fire extinguishing system from pipes containing air at a pressure either a little above or a litttle below that of the atmosphere.

The valve is particularly applicable in an ordinary automatic wet pipe system where certain portions thereof may at times be exposed to freezing temperatures, as for example where sprinklers are installed over an out-of-door shipping platform or near the glass exposure of a roof. The cost of installing and maintaining a usual type of dry pipe system for such exposures is rather high and so extensions of the wet pipe system are used when temperatures permit and then during the winter months these extensions are shut off and drained of their water contents. In case of fire occurring in these thus unprotected regions the cut-off valves are opened by hand or by some form of actuating devices auxiliary to the sprinkler system itself.

Instead of depending upon response by a human individual, or upon the more or less delicate auxiliary apparatus, it is an object of the invention to provide a simple and rather inexpensive valve which can be installed in a wet pipe system and which will normally be held closed by a force other than that exerted by the pressure in the pipes beyond the valve. For convenience, the water pressure itself may be so utilized; and since the areas upon which this force acts have designedly but a slight differential, the water pressure carried can, if desired, be much less than is customarily required in the usual dry pipe systems.

It is also an object of the invention to provide for the actuation of the valve in response to a change of pressure conditions in the pipes beyond the valve leading to the sprinkler heads thus eliminating any auxiliary devices. These pipes may either contain air at a relatively low pressure or there may be a vacuum present. In one case an inexpensive pump of the vane type can furnish sufficient pressure and in the other case a simple form of ejector is satisfactory for maintaining the desired vacuum.

Another important object of the invention is to provide against a reclosing of the valve after it has been actuated to open. This object is attained in several ways, first by providing certain mechanism which becomes permanently displaced during the initial action of the valve, second, by effecting a constant flow of water through an ejector nozzle and thereby preventing any re-establishment of a closing pressure on the valve, and third by providing a closure element which is moved laterally away from its seat and out of any possible contact with the parts of the valve which normally hold it closed.

In the illustrated embodiments of the invention, the valve shown is of the differential type, although it is not necessarily so, with its closure element seating across the inlet opening from the wet pipe and with its valve chamber in open communication through a side outlet with the air filled pipes of the system.

The water pressure acts directly on the closure to open it, and exerts an opposing force by way of a by-passage, diaphragm and strut, to hold it closed. This by-passage includes an ejector so arranged that when its discharge port is closed the water exerts pressure on the diaphragm but when the said port is open the water flows therefrom and acts with aspirating effect upon the pressure in the diaphragm chamber. The port is normally closed by a needle valve held to its seat by a latch and the latter in turn is engaged by a trip lever associated with a pressure actuated device in the form of a siphon bellows which is subjected to the pressure of the dry pipe. Upon a change occurring in this pressure due to the opening of an automatic sprinkler the lever is tripped, the latch released and the needle valve opened, with consequent discharge of water through the ejector nozzle. This almost instantly reduces the pressure on the diaphragm thereby permitting the water pressure acting directly on the closure to lift it. The closure is mounted on a novel pivot which causes the closure to tilt as it is lifted and position itself obliquely to the flow of water through the inlet. The thrust of this flow swings the closure laterally about its pivot, free from any contact with the strut and out of the direct course of flow, to a position where it can settle slightly below the level of its seat.

Although particularly described in its application to a portion of a wet pipe system, the valve of the invention is not so limited for it can be incorporated in any dry pipe system. Its advantages over the common types of dry pipe valves are many. It requires no substantial air pressure to keep it closed. On the contrary the dry pipe can contain air at a very low pressure, even below that of atmosphere. It requires no considerable water pressure to effect its opening but opens very satisfactorily with low water pressures. It can not be reclosed after once opening. The valve has no air valve in the customary sense of that term and no rubber gasket, therefore it is free from the usual troubles of sticking and deterioration which accompany the use of such a gasket. Since all the parts can be made of metal, which can be selected to guard against corrosion of the moving parts, the valve requires little or no attention and when once set can be relied upon to function after an indefinite period of inactivity.

It is intended that the patent shall cover by suitable expression the appended claims whatever features of patentable novelty exist in the invention disclosed.

In the accompanying drawings:

Figure 3 is an elevation showing a modified form of tripping mechanism to be used when a vacuum is normally maintained in the dry pipes;

Figure 4 is a plan, as on line 4—4 of Figure 1 showing the closure and its mounting; and Figure 5 is an elevation in section as on line 5—5 of Figure 4.

Figure 1:
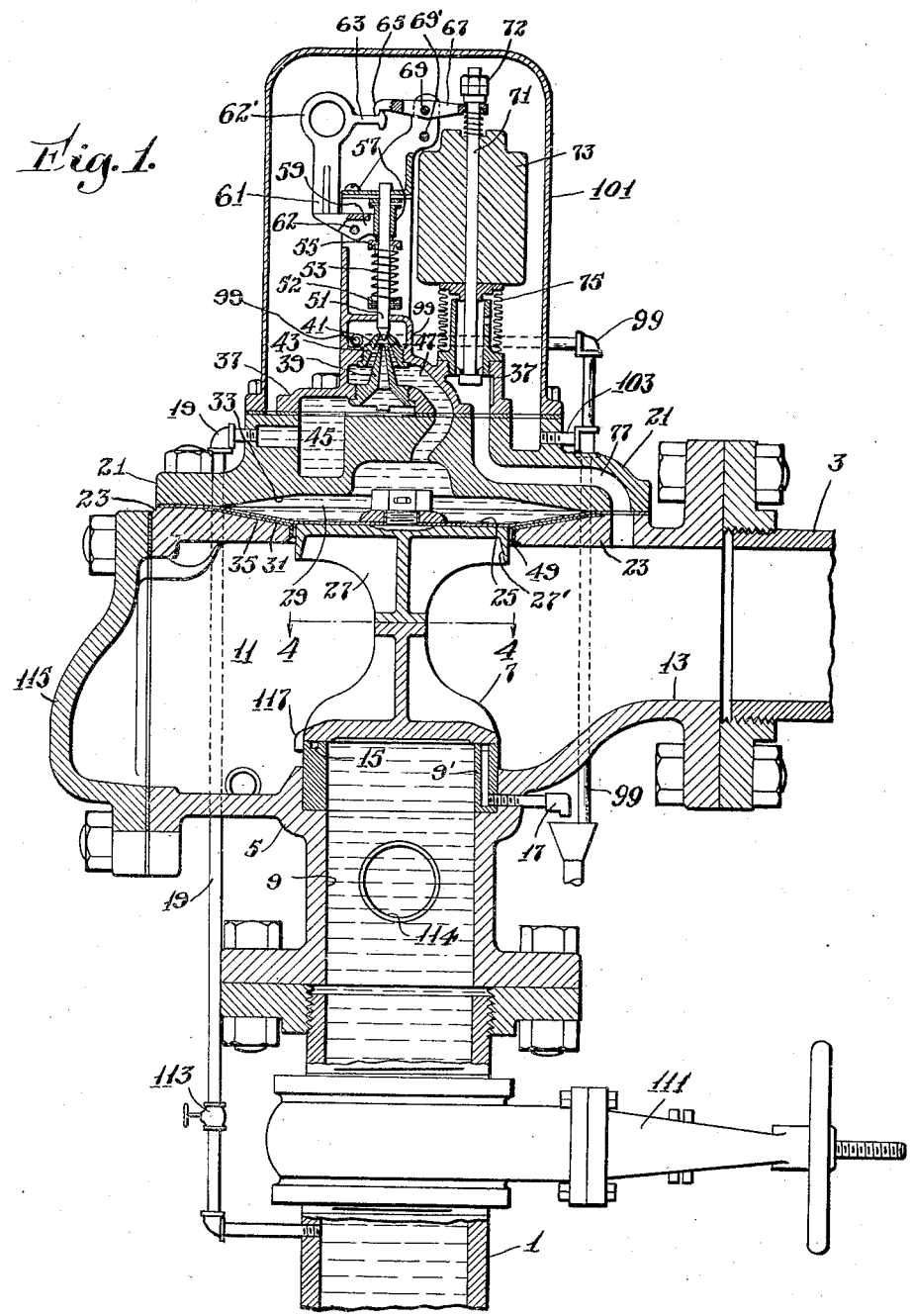
Figure 1 is an elevation in section of a valve embodying the present invention, the parts being shown in their respective positions when the valve is closed.

Referring to the drawings the pipe 1 represents a wet pipe sprinkler system or other source of supply in which water under pressure stands ready for sprinkler discharge. The pipe 3 represents dry distributing pipes extending to sprinklers (not shown) in locations exposed to freezing temperatures or where for other reasons it may be desired to have no water in the pipes until the need of sprinkler discharge arises. Between the pipe 1 and the pipe 3 is a valve 5 having a closure element 7 seating across the inlet 9. The valve chamber 11 and pipe 3 are in open connection with one another through the outlet 13, and normally contain air at a slight pressure either above or below that of the atmosphere. A small groove 15 in the inlet seat 9' and a drain therefrom through the customary ball drip valve 17 take care of any leakage of water from the inlet.

The water acts directly upon the closure 7 tending to open it and also acts indirectly upon it to keep it closed until a change of the air pressure conditions bring about the opening of the valve. This indirect or closing action of the water is accomplished by means of a by-passage through a pipe 19 extending from the inlet side of the closure to an intermediate portion 21 attached to the top side of the body portion 23. A diaphragm 25 is clamped at its periphery between these two portions and at its middle is secured to a strut member 27 which, when the valve is closed, engages the closure 7. The two portions 21 and 23 are suitably shaped to provide a chamber 29 for this diaphragm, with beveled seats 31 and 33 extending inward upon which an annular portion of the diaphragm may rest. The lower (31) of these seats is preferably provided with a rust-resisting metal face 35 to prevent corrosion and any sticking of the diaphragm.

Mounted on the intermediate portion 21 is a top portion 37 having an ejector comprising an internal nozzle 39 extending within an external nozzle 41 but being slightly spaced therefrom to provide an annular passage 43 therebetween. The internal nozzle 39 is connected by suitable passages 45 in the top and intermediate portions with the pipe 19 leading from the water supply and the annular passage 43 is similarly connected by another passage 47 with the diaphragm chamber 29. Accordingly, the water pressure is transmitted through the pipe 19, the passage 45, nozzle 39, annular passage 43, and passage 47, to the chamber 29 where it is exerted upon the diaphragm 25 and thence through the strut 27 upon the closure 7. Since the effective opening 49 in the top wall of the body portion 23 is somewhat greater in area than that of the inlet 9, the water pressure acting on the diaphragm over the opening 49 will hold the closure seated against the water pressure of the same intensity tending to lift it. This differential of area need not be large, indeed there may be no such differential because the weight of the diaphragm, strut and closure acts with sufficient force to hold the latter closed when the opening and closing effects of the water are in balance. However, to insure tight seating of the closure it is desirable to have a differential of area with consequent excess of total water pressure acting to keep the valve closed.

When this condition exists, the discharge port of the external nozzle 41 is closed by a needle valve 51. The stem of this valve has pinned to it near its lower end a collar 52 upon which bottoms an expansion spring 53 coiled about the stem and pressing also against another collar 55 loose on the stem. This latter collar is engaged by the forked arm 59 of a bell crank lever 61, fulcrumed at 62, whose other arm constitutes a ring handle 62' and latch 63. When in closed position, as seen in Figures 1 and 3, the lever depresses the loose collar 55 and by virtue of the spring 53 and pinned collar 52, forces the needle valve tightly against its seat.

When the distributing pipe 3 contains air at a pressure above atmosphere the upper hook of the latch 63 is engaged by a lever 67 fulcrumed at 69 and disposed with its hooked end 65 pointed downward. (See Figure 1.) The other end of this lever is of ring shape fitting somewhat loosely about a spindle 71 under the lock nuts 72. A weight 73 secured upon this spindle rests upon a pressure actuated device, here shown as a siphon bellows 75 suitably mounted on the top portion 37. The interior of the bellows is in open communication through passage 77 with the valve chamber 11 so that the air pressure of the dry pipes is acting to keep the bellows expanded and the weight suspended as shown in Figure 1.

When the pipe 3 contains air at a pressure below the atmosphere the bellows 75 is contracted and it is necessary to substitute for the weight of Figure 1, a coiled spring 79 (see Figure 3) which acts in opposition to the bellows and tends to raise the stem 71. This spring may be seated upon a bracket 81 added between the bellows support 83 and the top portion 37 and presses against a collar 83 suitably secured to the stem. The lever 67 in this case is reversed and fulcrumed at 69' with its hooked end 65 extending upward to engage the latch lever 63. So long as the vacuum continues in the dry pipes the bellows will be contracted, the spindle pulled downward, and the lever held in hooked engagement with the latch.

Upon a change of pressure conditions occurring in pipe 3 as upon the opening of a sprinkler and the escape of air from the pipe or an inflow of air thereto depending upon the initial conditions, the siphon bellows responds and either allows the weight 73 to force the stem 71 downward or permits the coiled spring 79 to move the stem upward. In either event the lever 65 is swung about its pivot thus freeing the latch lever 63. This initial movement of the lever 61 about its pivot 62 is very rapid due to the immediate expansion of the spring 53 forcing the loose collar 55 away from the pinned collar 52 along the needle valve stem 51 up against the flanged sleeve 57 which is pinned to the sleeve. This rapid movement of the loose collar starts the lever 61 on its swing and the momentum of the blow delivered by the loose collar against the sleeve causes the needle valve to lift somewhat from its seat. This lifting is further augmented as the lever 61 continues its swing under the influence of gravity with its forked arm 59 forcing the sleeve 57 and needle valve upward. It is to be noted that the engagement of the loose collar 55 with the sleeve 57 renders the coiled spring 53 thereafter inactive. Upon the lifting of the needle valve, water immediately starts to flow through the external nozzle 41 and escapes by drain pipe 99. Such leakage as may occur about the valve stem 51 into the space of the cap 101 also drains through connection 103 into pipe 99.

The flow through the annular passage 43 and the port of nozzle 41 acts with aspirating effect through the internal nozzle 39 to draw water from the passage 47 and diaphragm chamber 29. This immediately reduces the pressure above the diaphragm to nothing (possibly creating a slight vacuum above it) and permits the water in the inlet 9 to lift the closure 7 from its seat and flow into the valve chamber and the distributing pipe 3. The strut 27 is provided around its top edge with a depending lip 27' which fits rather close to the edge of the opening 49 so that as the diaphragm and strut move upward the opening is still substantially closed by the strut, thereby preventing any foreign matter carried by the water from entering the opening 49 and lodging on the tapered seat 31.

Figure 2:
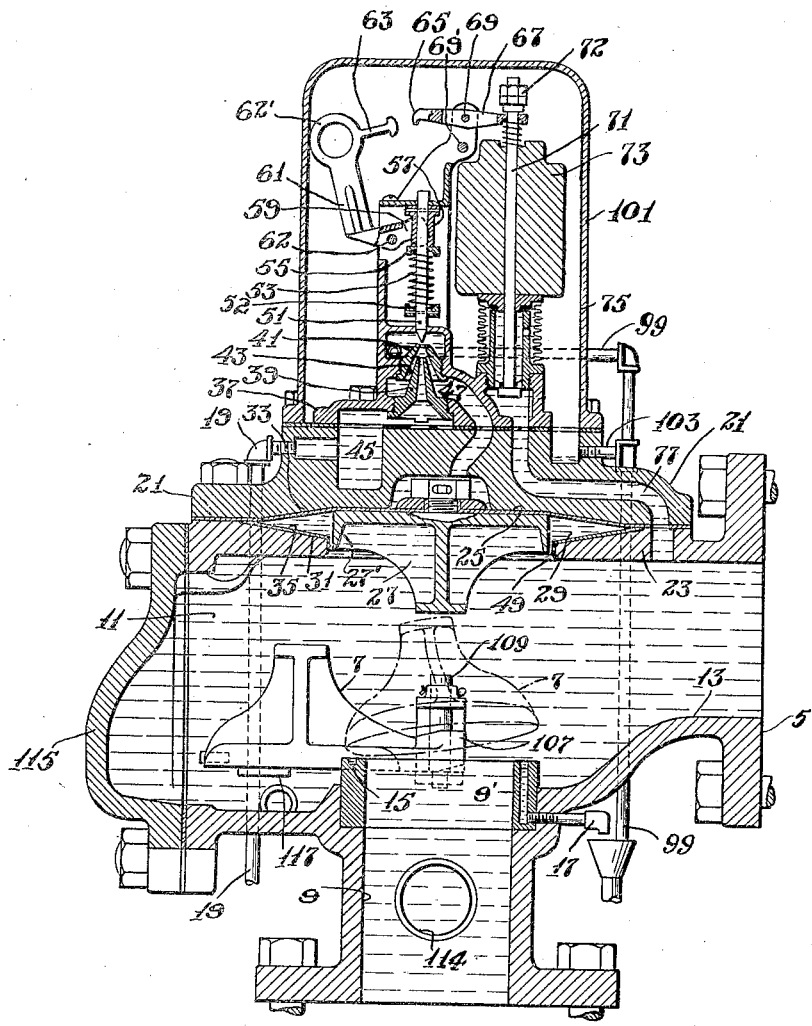
Figure 2 is a similar view with the parts shown in position after the valve has opened.

Simultaneously with the lifting of the closure 7, the latter assumes a tilted position oblique to the direct flow of water through its seat. This tilting is effected by a novel shaping of the bearing 105 in the arm 107 of the closure, it being deformed from a true cylindrical bearing by making one side of its upper half and the opposite side of its lower half conical in shape (see Figure 5). As it lifts the closure as a whole assumes the position shown in dotted outline in Figure 2 with its face oblique to the water welling upward through its seat and, in consequence, is then swung laterally about its pivot 109 to one side of its seat and entirely out of the path of movement of the strut 27. There the closure settles down again to a level a little below the plane of its seat, being thus prevented from again swinging thereacross.

In resetting the valve, the water supply is shut off by the gate valve 111 from the inlet 9 and from the pipe 19 by the valve 113. The valve chamber and pipe 3 are then drained through a suitable connection indicated by circle 114 in Figure 1. The cover 115 is next removed, the seat 9' cleaned and the closure lifted and swung across its seat, its position being determined by the engagement of the stop 117 with the edge of the seat. The strut 27 will probably be found in its lower position since upon the shutting off of the water to the pipe 19 the flow of water from the ejector ceases thus upsetting the suction on the diaphragm chamber. The strut can be easily lifted and the closure swung below it as described. The cover is then replaced and air is either pumped into or withdrawn from the pipe 3 and chamber 11 until the siphon bellows responds and moves the spindle 71 and lever 67 into latch engaging position. The cap 101 is removed and the latch lever swung upward and to the right to engage the hook-end of lever 67. This closes the needle valve 51. Water can now be admitted to the diaphragm chamber by opening the valve 113, after which the gate valve 111 is opened. The valve is now reset and requires no further attention or maintenance until after it has again been opened in response to a pressure change in the distributing pipes.

I claim as my invention:

1. A valve for a dry pipe system having, in combination an inlet and outlet with waterway between; a closure adapted when seated to close said inlet and when opening to be moved laterally out of the waterway to a position beside its seat; means holding said closure seated comprising a movable element making contact on one side with said closure and having its other side connected to a source of fluid pressure; an ejector in said connection adapted when opened to release the pressure on the movable element; a valve closing said ejector; means responsive to the pressure in said system holding said ejector valve closed and adapted upon change of pressure conditions in said systems to open said valve, whereby the flow through the ejector releases the closing pressure on said element, thereby permitting the closure to open and be moved laterally out of the waterway by the flow through its seat.

2. A valve for a sprinkler system having an inlet and a closure therefor; a movable element holding said closure closed, having connection with a source of fluid pressure; an ejector in said connection adapted upon flow therethrough to release the pressure on the movable element; a valve for preventing flow through said ejector; and means normally holding said valve closed but responsive to the establishment of a predetermined pressure in the sprinkler system beyond said closure to open said ejector valve.

3. A valve for a sprinkler system having an inlet and a closure therefor; a movable element holding said closure closed having connection with a source of fluid pressure; an ejector in said connection adapted upon flow therethrough to release the closing pressure on said element; a valve controlling the flow through said ejector; and means normally holding said valve closed comprising a latch and a pressure responsive device for releasing said latch; said device operating to effect such release upon the establishment of a predetermined pressure in the sprinkler system beyond said closure.

4. A valve for a sprinkler system having an inlet and a closure therefor; a movable element holding said closure closed having connection with a source of fluid pressure; an ejector in said connection adapted upon flow therethrough to release the closing pressure on said element; a valve controlling the flow through said ejector; and means normally holding said valve closed comprising a lever holding said valve seated, a latch engaging said lever and a pressure responsive device controlling said latch and adapted upon the establishment of a predetermined pressure in the sprinkler system beyond said closure to release said latch and thereby effect the opening of said valve.

5. A valve for a sprinkler system having an inlet and a closure therefor; a movable element holding said closure closed having connection with a source of fluid pressure; an ejector in said connection adapted upon flow therethrough to release the closing pressure on said element; a valve controlling the flow through said ejector; and means normally holding said valve closed comprising a lever holding said valve seated, a latch engaging said lever and a pressure responsive device controlling said latch and adapted upon the establishment of a predetermined pressure in the sprinkler system beyond said closure to release said latch and thereby effect the opening of said valve; the engagement between said lever and latch being such that when once released it cannot be reestablished by subsequent action of said device in response to pressure changes in said system.

Signed at Providence, Rhode Island, this 31st day of December, 1928.

ALBERT J. LOEPSINGER.